June 28, 1966 E. HAFNER ETAL 3,257,704

METHOD OF MOUNTING HIGH FREQUENCY PIEZOELECTRIC CRYSTALS

Filed May 4, 1964

INVENTORS,
ERICH HAFNER
EDWARD R. NOLAN
BY: Harry M. Saragovitz, Edward J. Kelly, Herbert Berl & Julian C. Keppler
ATTORNEYS.

United States Patent Office 3,257,704

Patented June 28, 1966

3,257,704

METHOD OF MOUNTING HIGH FREQUENCY PIEZOELECTRIC CRYSTALS

Erich Hafner, New Shrewsbury, and Edward R. Nolan, Manasquan, N.J., assignors to the United States of America as represented by the Secretary of the Army Filed May 4, 1964, Ser. No. 364,863
2 Claims. (Cl. 29—25.35)

The invention described herein may be manufactured and used by or for the Government for governmental purposes without the payment of any royalty thereon.

This invention relates to high frequency piezoelectric crystals, and more particularly to an improved method for mounting such high frequency crystals in holders or supports.

Quartz crystals vibrating in their thickness shear modes are in wide use for the control of high frequencies. A major problem in the mounting of such crystals is concerned with the type of bond between the support structure and the crystal itself. Nearly all methods employed in the past for mounting high frequency piezoelectric crystal blanks required the use of either bonding cement which ultimately decomposed, or solder which has a relatively low melting point. These prior techniques have been found to introduce undesirable contaminants into the crystal unit, and have made it impossible to use high bake-out temperatures during the fabrication process.

Accordingly, it is an object of the present invention to provide a method of fabricating and assembling high frequency piezoelectric crystal blanks in holders or supports to overcome the deficiencies of the prior art techniques.

For a more detailed description of the invention, together with other and further objects thereof, reference is had to the following description taken in connection with the accompanying drawing, in which similar numerals designate similar elements and wherein.

Figure 1:
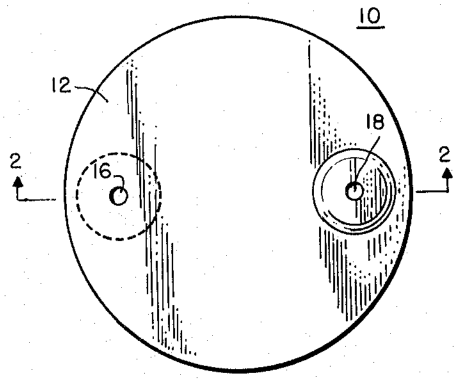
FIG. 1 is a plan view of a piezoelectric crystal blank used in the process of the invention, showing a step in the process.
Figure 2:
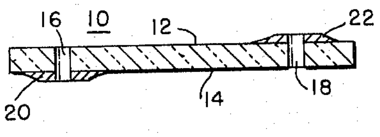
FIG. 2 is a sectional view taken along line 2—2 of FIG. 1.

In the drawing and referring to FIGS. 1 and 2, numeral 10 designates a piezoelectric crystal blank, such as natural or synthetic quartz, having opposite flat ground and polished major surfaces 12 and 14. Blank 10 may be square but preferably is of a circular shape, and is a standard, zero-temperature coefficient cut, such as at AT or BT-cut, vibrating in the thickness shear mode.

Crystal blank 10 is supported in any convenient manner and two holes 16 and 18 are formed through the crystal at spaced points near the periphery. These holes, shown diametrically opposite from each other, may be cut through crystal blank 10 in any desired manner such as by using an abrasive drill or a stream of abrasive or by any other means as long as clean and well-defined holes of small dimensions, approximately 0.025 inch in diameter, are produced through the crystal. The diameter of holes 16 and 18 will depend upon the size of the crystal blank that is to be supported, however, the above dimension is satisfactory for a blank that is provided with major faces that are approximately one half inch in diameter and thickness of which is approximately 0.004 inch. In drilling or cutting the holes 16 and 18 through the crystal blank 10, consideration of prime importance resides in the fact that no incipient cracks or fractures may be produced around the edges of the holes formed in the crystal blank during the cutting of said holes. Furthermore, no strains or stresses which would result in cracks or flaws being produced in the crystal, should result from the operation.

After the desired holes 16 and 18 are provided in crystal blank 10, respective plated areas 20 and 22 are evaporated thereon around each hole, on opposite major faces 12 and 14, respectively, the plating being applied to only one major face around each hole of the crystal. Plated areas 20 and 22 are preferably circular and may be formed of suitable metal such as gold.

Figure 3:
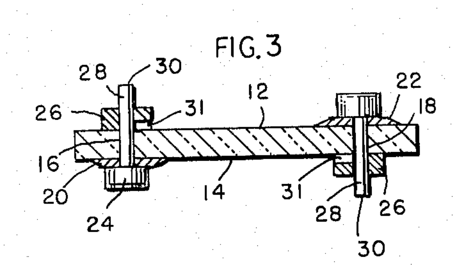

Similar gold rivets 24 are then inserted into each of the holes 16 and 18, respectively, with the rivet heads contacting the respective plated areas 20 and 22 of crystal blank 10. The diameter of each of the plated areas 20 and 22 is greater than the diameter of each of the rivet heads, so that the circumference of the plated areas extends beyond the circumference of the rivet heads, as shown in FIG. 3. Respective gold washers 26 are now positioned onto each of the rivet shanks 28 leaving the ends of the shanks 30 extending through the respective washers 26. Gold washers 26 are each provided with a radial channel 31, approximately 0.02 inch in cross-section extending from the periphery of each washer to its center hole. The washers 26 are so positioned that each of the channels 31 lies against crystal blank 10.

Figure 5:
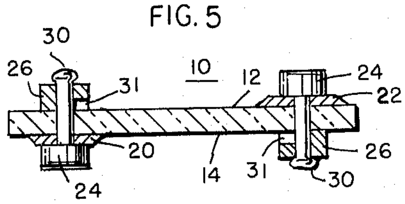
FIGS. 3, 4 and 5 are sectional views illustrating further steps in the process.
Figure 4:
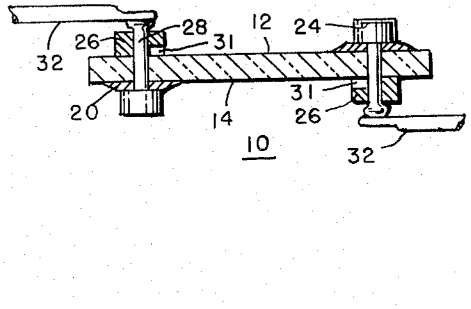

An annealed gold wire 32, approximately 0.010 inch in diameter is then thermocompression bonded to the ends 30 of each of the rivets 24, as shown in FIG. 4. As the gold wire 32 is bonded to the rivet 24 by the application of the proper heat and pressure, the shank ends 30 of the rivets increase in diameter in the region of the gold washers 26, permitting any air in the holes 16 and 18 to escape through the respective channels 31 in washers 26. This slight compression at the ends of the rivets 24 has been found beneficial in effecting a firm mounting of the crystal blank 10. On the other hand, the rivet ends 30 may be compressed against washers 26 before thermocompression bonding the respective gold wires 32 to the rivet, as is shown in FIG. 5.

Figure 6:
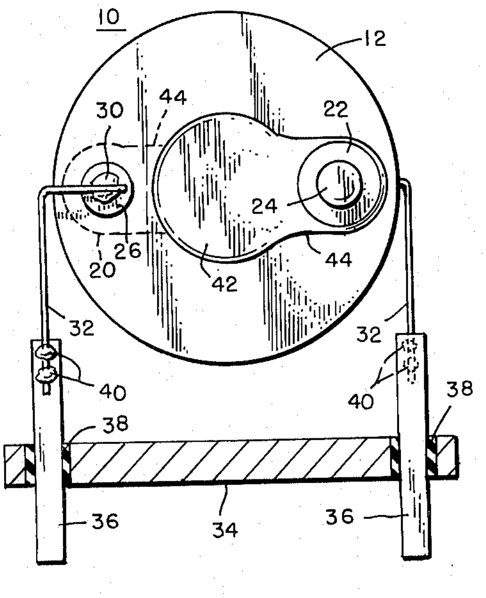
FIG. 6 is a view, partly in section, to illustrate the manner of mounting the piezoelectric crystal blank and establishing electrical connection with the electrodes thereof.

The unit comprising crystal blank 10, rivets 24, washers 26 and gold wires 32 are now assembled in a holder, such as shown in FIG. 6, which includes a base 34 that is provided with a pair of plug-in pins 36, preferably of molybdenum. The pins 36 are supported in the base 34 by suitable insulation sleeves 38 through which these pins extend. Each of the gold wires 32 is attached at 40 to the tops of the respective pins 36 by spot welding or the like.

Still referring to FIG. 6, the mounted crystal 10 is then plated to the proper frequency by applying electrically conductive electrodes 42 to each of the central portions of the major faces 12 and 14. In FIG. 6, only the electrode secured on surface 12, is shown. Electrodes 42 are disc-shaped metallic films applied by any suitable method, such as vacuum plating or cathode sputtering, and constitute the means by which the voltage impulses are impressed upon or taken from the crystal 10. To that end, narrow conducting paths 44, also formed of metallic film, lead from the electrodes 42 to the evaporated films 20 and 22, respectively, the electrical path being completed through the rivets 24 and the respective gold wires 32.

While there has been described what is at present a preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. The method of mounting a piezoelectric crystal blank having opposing major faces in a holder having plug-in pins, comprising forming two holes at spaced points near the periphery of said crystal blank for securing electrical circuit terminals to said crystal blank, said holes being small compared to a dimension of a major face of said crystal blank and said holes being formed so that no incipient cracks are produced in the side walls thereof, evaporating a thin film of conducting material around each of said holes on opposing major faces of said crystal blank, said thin films being applied around one hole on each major face, inserting gold rivets in each of said holes through opposing major faces so that the rivet heads contact a respective film of conducting material around each of said holes with the circumference of each of said plated areas extending beyond the circumference of each of said rivet heads, the shanks of said rivets extending through said holes and protruding beyond the surface of said crystal blank, positioning gold washers over each of said rivet shanks with the ends of said rivets extending through each of said washers, said gold washers being provided with a radially cut channel extending from the periphery of the washer to its respective center hole, said washers being so positioned so that each of said channels lies against said crystal blank, bonding one end of respective annealed gold wires to the respective shank ends of said rivets by the application of heat and pressure whereby the rivet shank ends increase in diameter to bond said wires to said rivet shank ends and to effect a firm mounting of each of said rivets to said crystal, attaching each of the free ends of said annealed gold wires to discrete plug-in pins of said holder, and applying electrically conducting electrodes to each of said major faces so that said crystal blank will operate in the desired frequency, said electrodes having narrow conducting portions extending to the periphery of said crystal blank and overlapping the respective thin film of conducting material extending beyond the circumference of said rivets.

2. The method as set forth in claim 1 wherein said holes are diametrically opposite from each other.

References Cited by the Examiner

UNITED STATES PATENTS

| | | | |
|---|---|---|---|
| 2,412,030 | 12/1946 | Baldwin | 310—9.4 X |
| 2,453,435 | 11/1948 | Havstad | 310—9.1 X |

JOHN F. CAMPBELL, *Primary Examiner.*

W. I. BROOKS, *Examiner.*